DIRECT POSITIVE SHEET AND AN OFFSET PRINTING PLATE PRODUCED THEREFROM

Filed Sept. 11, 1970

INVENTORS

Kiyoshi Futaki

Shigeyoshi Suzuki

Yoshitaka Yoshihiro

BY Cushman, Darby & Cushman

ATTORNEYS 3,728,114

DIRECT POSITIVE SHEET AND AN OFFSET PRINTING PLATE PRODUCED THEREFROM

Kiyoshi Futaki, Shigeyoshi Suzuki, and Yoshitake Yoshihiro, Kyoto, Japan, assignors to Mitsubishi Paper Mills, Ltd., Tokyo, Japan Filed Sept. 11, 1970, Ser. No. 71,623
Claims priority, application Japan, Sept. 12, 1969, 44/72,039; Apr. 27, 1970, 45/36,146
Int. Cl. G03c *1/48, 5/54;* G03f *7/02*
U.S. Cl. 96—29 L 7 Claims

ABSTRACT OF THE DISCLOSURE

An offset printing plate can be obtained from a positive sheet whose surface layer contains up to 30% by weight of nuclei for physical development of a high molecular compound without complicated after-treatment.

This invention concerns a direct positive sheet suitable for producing an offset printing plate and more particularly relates to a direct positive sheet (image receiving layer) for silver complex diffusion transfer process which is suitable for production of an offset printing plate.

Furthermore, this invention relates to an offset printing plate obtained from said direct positive sheet.

The direct positive sheet according to this invention comprises a hydrophilic subbing layer coated support which is a water resisting paper or a synthetic resin film and a surface layer thereon which contains nuclei for physical development which are fine particles of heavy metals or sulfides thereof and up to 30% by weight of said nuclei for physical development of a high molecular weight compound.

Examples of the nuclei for physical development are Au, Ag, Cu, Se, Cd, Zn, CuS, $Ag_2S$, HgS, PdS, and ZnS, Examples of the high molecular weight hydrophilic compounds are gelatin, polyvinyl pyrrolidone, polyvinyl alcohol, polyacrylamide, hydroxy ethyl cellulose, methyl cellulose, copolymer of acrylamide and N-vinyl imidazole, carboxymethyl cellulose, copolymer of styrene and maleic anhydride.

Therefore, the silver film which grow on the nuclei for physical development by diffusion transfer of silver complex salt to provide an image forms a silver image having mirror surface.

Figure 1:
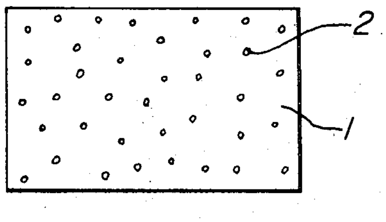
Figure 2:
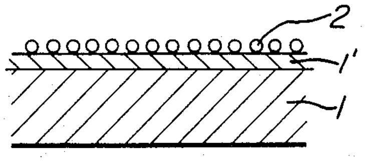
Figure 3:
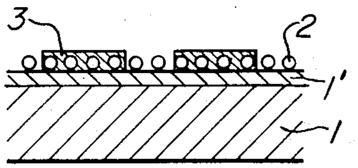

FIG. 1 shows a plane distribution of catalyst nuclei for reducing silver salt in the direct positive sheet of this invention and FIG. 2 shows a cross-sectional distribution of the nuclei. FIG. 3 shows a cross-sectional view of an offset printing plate of this invention, on which silver image is formed. In these FIGS. 1 to 3, 1 is a water resisting paper or a synthetic resin film, 1' is a hydrophilic subbing layer, 2 is catalyst nuclei (nuclei for physical development) of fine particles of heavy metals or sulfides thereof for reduction of silver salt and 3 is a silver image obtained by diffusion transfer of silver complex salt.

Figure 4:
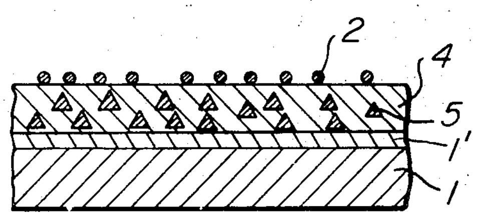
Figure 5:
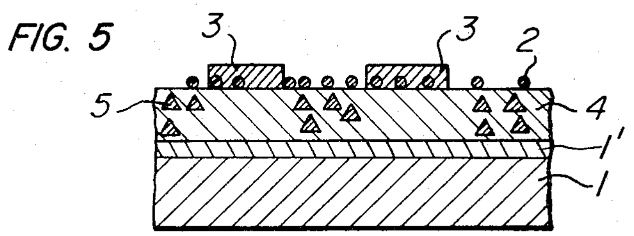

FIG. 4 shows a cross-sectional view of a modified direct positive sheet of this invention and FIG. 5 shows a cross-sectional view of an offset printing plate obtained from said modified positive sheet. In these figures, 1 is a water resisting paper or synthetic resin film, 1' is a hydrophilic subbing layer and 4 and 5 are high molecular weight dispersing agent such as gelatin and silver halide particles, respectively.

2 is catalyst nuclei (physical developing nuclei) of fine particles of heavy metals or sulfides thereof for reduction of silver salt and 3 is a silver image obtained by diffusion transfer of silver complex and 5 is metallic silver particles converted from silver halide by exposure and development treatment.

Since the offset printing plate of this invention utilizes the oleophilic property of metallic silver, a metallic silver image which is naked is formed on the surface of hydrophilic support. In reproduction of an image according to the usual silver complex diffusion transfer process, a silver halide emulsion layer (negative layer) which records a negative image and is a source for soluble silver salt, a positive layer containing heavy metallic nuclei for producing reduced silver and a developing solution for diffusion transfer are used. In order to produce an offset printing plate according to this invention, commercially available negative and developing solution can be used and only the positive must be specifically prepared. According to the positive image receiving layer whose support is paper or a synthetic resin film and which has been usually employed, only a photographic positive image is obtained and various troublesome chemical treatments are required for obtaining a printing plate from such conventional image receiving layer. This is because in the positive layer used for photograph, metallic silver which is deposited by reduction on catalyst nuclei is completely wrapped with protective colloids such as gelatin, polyvinyl alcohol, etc. which are present in a large amount in said layer and hence both image part and non-image part are caused to be hydrophilic.

According to this invention, in order to impart an oleophilic property required for printing to a positive image formed on a support having a subbing layer having a hydrophilic property, a positive image receiving layer is particularly prepared to cause direct and mutual adhesion of separated silver particles at the image part and also cause nakedness of mass of the silver particles (silver film) on the surface of the subbing layer of the support layer. Said positive image receiving layer particularly prepared has the distribution of the nuclei as shown in FIGS. 1 and 2. Therefore, the hydrophilic property of the support used is not reduced and hence the image part which is the naked silver film and the non-image part which is the positive image receiving layer part having the hydrophilic property are different in their affinity to the printing ink. Thus, the positive image receiving layer (direct positive sheet) can be used directly as an offset printing plate without specific treatments.

The support of the direct positive sheet or printing plate of this invention is a water resisting paper or a synthetic resin film and the support is required to be subjected to a treatment to form a hydrophilic subbing layer on the surface of the support in order to apply the above mentioned nuclei for physical development to the surface of the subbing layer by a vacuum evaporation method, a conventional coating method, etc. to attain sufficient adhesion strength and simultaneously to increase printing ink repelling property of the surface. In case of synthetic resin film, such treatment for forming a hydrophilic subbing layer is the same as the treatment made in applying the usual photographic emulsion which is mainly composed of silver halide and gelatin. For example, the methods as mentioned in British Patent No. 971,433 and Japanese patent publication No. 2597/69 may be used. Furthermore, the commercially available polyester films such as "polyester film PR/2 for photograph" whose both sides are treated and which is made by Celfa Co. in Switzerland and "Film base for printing whose both sides are treated with gelatin" made by Bexford Ltd. in England may be used. In case of using a water resisting paper, the treatment for forming the subbing layer to impart hydrophilic property may be carried out by applying water soluble high molecular weight compounds such as gelatin, alginic acid, polyvinyl pyrrolidone, etc. to the surface of the paper.

The nuclei for physical development applied on the hydrophilic support having a subbing layer thereon according to this invention as shown in FIGS. 1 and 2 should be applied in such a manner that fine particles of heavy metals or sulfides thereof having a diameter of about 50 A. are uniformly and planely distributed at intervals of 100–300 A. and that the particles are dispersed in such state that at least a part of the surfaces of the fine particles are not completely and thickly wrapped with high molecular compound contained in the surface layer. The layer in which the metal fine particles are dispersed in such distribution can be obtained by vacuum evaporation method, cathode spattering method, coating method, etc. According to the vacuum evaporation method, for example, silver is evaporated and deposited under a reduced pressure of $10^{-3}$–$10^{-6}$ torr on Tetron polyethylene terephthalate film to which a suitable undercoat has been applied. A film of so-called island structure which is formed at an initial stage of formation of evaporation film is the positive material of this invention and can be easily obtained. Furthermore, according to the coating method, a hydrosol of, for example, silver having a size of about 50 A. is prepared and this hydrosol is applied in single layer to a polyester film which has been subjected to a treatment for forming a subbing layer to impart hydrophilic property by a suitable method such as dip coating method to obtain the distribution of the metal particles similar to island structure of vacuum evaporation film. Thus obtained direct positive sheet can be used as an offset printing plate. When a sol of fine particles of heavy metals or sulfides thereof is prepared by a chemical reaction and this is applied to a support having a subbing layer thereon, special care should be given to the amount of high molecular compound added in view of protective action of colloid and increase of viscosity. In this invention, various hydrophilic high molecular weight compounds may be used. However, regarding the layer in which nuclei for physical development are dispersed, the positive sheet of this invention is extremely different from the usual positive sheet for silver complex diffusion transfer method. Unless the thickness of the high molecular weight compound film of nuclei for physical development is less than 20–30 A., the transferred silver film cannot be naked on the surface and hence thus obtained positive sheet is not suitable as an offset printing plate. The commercial positive material has a film of a thickness of greater than hundreds A. and transferred layer is a continuous film. On the other hand, in the positive sheet of this invention, the surfaces of the nuclei for physical development are coated with a high molecular weight film of 30 A. in thickness, but transferred layer is not a continuous film and the nuclei are dispersed and distributed as individual particles.

In order to obtain the distribution as mentioned above, it has been experimentally established that the content of the high molecular weight compound should be up to 30% by weight of nuclei for physical development, although there is some difference depending upon the nuclei for physical development used and specific gravity of high molecular weight materials. The research on the weight ratio between the physical developing nuclei and the high molecular weight compound on the above mentioned point has never been made and the characteristic of this invention resides therein. For example, dispersibility in liquid and adhesiveness to supporting material of the nuclei for physical development produced by chemical reaction are satisfactory when conditions for production of the nuclei and kind of the supporting material are properly selected. However, addition of the high molecular weight compound further improves said properties in some case. In such case, also the high molecular weight compound must be added in an amount of up to 30% by weight of the nuclei in order to obtain the features as an offset printing master of this invention. Regardless of the way of production of nucleus for physical development, the size of the nuclei should be 20–100 A. and the distance between the nuclei particles should be about 50–300 A. The silver image formed by diffusion transfer of silver complex is a film having a thickness of 500–2000 A. as shown in FIG. 3 and thus massive silver having high oleophilic property is produced. This positive sheet having silver image can be directly used as an offset printing plate. In case of using a high molecular weight compound for the production of nuclei for physical development, the transferred silver film is also naked on the surface by adjusting the amount of the high molecular weight compound to up to 30% by weight of the nuclei as in case of vacuum evaporation. Thus, no specific after-treatments are required for obtaining an offset printing plate therefrom.

A modification of the direct positive sheet of this invention will be explained below.

A direct positive sheet according to this modification comprises a suitable support of a water resisting paper or a synthetic resin film having a hydrophilic subbing layer thereon, a layer of usual photosensitive silver halide gelatin emulsion applied on said subbing layer and a surface layer containing nuclei for physical development of fine particles of heavy metals or sulfides thereof applied on said photosensitive layer. That is, in order to utilize oleophilic property of metallic silver, metallic silver image naked on the surface of hydrophilic gelatin-silver halide emulsion layer is formed. The gelatin-silver halide emulsion coating is exposed and developed to convert the exposed silver halide into metallic silver. However, since this metallic silver is wrapped with a large amount of high molecular weight material such as gelatin, said metallic silver is not naked on the surface of the coating layer. Therefore, when the usual gelatin-silver halide film is developed, the surface of the film is composed of only gelatin film, which is equally hydrophilic. Therefore, this cannot be used as an offset master.

Such direct positive sheet which is a modification of this invention is produced as follows:

A silver salt emulsion mainly composed of silver halide 5 and gelatin 4 in FIG. 4 is applied to the subbing layer 1′ on support 4 which is a water resisting paper or a synthetic resin film. In order to obtain and adhesion strength enough to stand offset printing, the support should usually be subjected to a treatment for forming a subbing layer on a support to impart hydrophilic property thereto. This may be attained by the same manner as mentioned before. In case of a water resisting paper, a water soluble high molecular weight compound such as gelatin, sodium alginate, polyvinyl alcohol, etc. is applied to the support.

According to this modification, a silver salt emulsion mainly composed of silver halide and gelatin is applied to a hydrophilic substrate. The silver salt emulsion may be optionally chosen from a low sensitive emulsion for contact printing, a high sensitive emulsion for enlargement and reduction of a printed original or other special sensitizing emulsion in accordance with the use thereof. That is, any silver salt emulsions may be employed.

Furthermore, the nuclei for physical development which is formed on the silver salt emulsion film applied to a support may be obtained in the same manner as mentioned before. Thus obtained layer of nuclei for physical development is nearly transparent to visible ray and has no effect on the photographic sensitivity of the silver salt emulsion.

Production of a printing plate in accordance with this modification is explained below. That is, the direct positive sheet obtained is subjected to contact exposure of original or reduction or enlargement and then treated with a mono-bath diffusion transfer developer containing a solvent for silver halide, e.g., HishiRapid developer for 30 seconds to one minute to obtain an offset printing plate. When the positive sheet is treated with a developer for silver complex diffusion transfer, exposed silver halide is developed to blacked silver and unexposed silver halide is converted into soluble silver complex ion, which diffuses to the surface and selectively reduced to deposit on the surface of fine particles of nuclei for physical development. However, since the layer of the nuclei for physical development is made not to be buried by the coating of the high molecular compound, the deposited metallic silver forms a silver image whose surface is naked and has affinity to ink. Two-bath treatment with a developer of silver salt emulsion and a diffusion solution requires 3–5 minutes, but control of tone can easily be attained. Therefore, such two-bath treatment is suitable for an original having various tone changes.

As is clear from the above explanation, according to said modification of this invention, a positive-positive master can be produced from one printing plate. Therefore, cost for plate-making is low and treatment is simple. Furthermore, since exposure and development treatment is simple, mechanization or automatization of the plate-making can be easily made and furthermore rapid plate-making can be attained.

As mentioned above, according to this invention, offset printing can be easily carried out without complicated after-treatment required for an offset printing plate in accordance wtih the conventional silver complex diffusion transfer process.

EXAMPLE 1

An under-coating solution having the following compositions was applied to the surface of a polyester film having a thickness of 100$\mu$ and thus treated film was dried at 60° C. in hot air to impart hydrophilic property to the surface of the film.

| | | |
|---|---|---|
| Grafted gelatin | g | 11 |
| Methyl alcohol | cc | 14 |
| Acetone | cc | 50 |
| Butyl acetate | cc | 50 |
| Diethylformamide | cc | 9 |
| Para-chlorophenol | g | 5 |
| Nitrocellulose | cc | 1 |

Using a small vacuum evaporation apparatus for experiment, silver sulfide powder was evaporated in an average thickness of about 10 A. to the polyester film of 7 cm. in width and 10 m. in length to which said hydrophilic undercoat was applied by resistance heating a molybdenum boat while moving said film at a rate of 20 cm./min. under a reduced pressure of $5\times10^{-5}$ torr.

This film to which silver sulfide nuclei are evaporated was taken out into air and was cut to a suitable length. The surface of this film and Mitsubishi Hishirapid NL for PF (commercial negative paper for silver complex diffusion transfer) which was contact-printed through an original were placed face to face and they were treated by Hishirapid processer using Mitsubishi Hishirapid developing solution. Hishirapid developer has the following compositions.

| | | |
|---|---|---|
| Hydroquinone | g | 10 |
| 1-phenyl-5-pyrazolidone | g | 1 |
| Sodium sulfite, anhyd. | g | 70 |
| Sodium hydroxide | g | 15 |
| Sodium thiosulfate, cryst. | g | 10 |
| Potassium bromide | g | 2 |
| Water | l | 1 |

The printing and transfer treatment was completed within about 1 minute.

The following etching solution and dampening solution which have been usually employed for offset printing were used.

| Etching solution: | G. |
|---|---|
| $NH_4H_2PO_4$ | 25 |
| Carboxymethylcellulose | 2.5 |
| Water was added to obtain a solution of 1000 cc. | |

| Dampening solution: | G. |
|---|---|
| $NH_4H_2PO_4$ | 10 |
| $Ni(NO_3)_2 6H_2O$ | 15 |
| Carboxymethylcellulose | 4 |
| Glycerine | 100 |
| Water was added to obtain a solution of 1000 cc. | |

The above solutions were diluted to 10 times with water, respectively.

Thus obtained etching solution was applied to all over the surface of said offset printing plate. This printing plate was set in an offset printing machine (for example, offset printing plate 1250 W manufactured by Addressograph-Multigraph Corp. in U.S.A.) and printing was carried out using said dampening solution. Usual offset ink was used as a printing ink. More than 400 copies were obtained by this printing. No copy was obtained with transferred image of a positive for the commercial silver complex diffusion transfer by the simple treatment as made in this example.

EXAMPLE 2

A silver sol having the following compositions (percent by weight) was prepared.

| | Cc. |
|---|---|
| 0.2% $AgNO_3$ | 10 |
| 1% KBr | 1 |
| 2% Formalin | 10 |
| 0.03 N NaOH | 100 |

Water was added to obtain a sol of 200 cc.

Said silver sol was applied by dip coating to a water resisting base paper whose surface was treated with 5% gelatin solution to impart hydrophilic property to the surface.

Thus obtained sheet was treated in the same manner as in Example 1 to obtain more than 500 copies.

EXAMPLE 3

A palladium sulfide sol was prepared as follows (percent by weight).

| | | |
|---|---|---|
| A solution: | | |
| PdCl | g | 5 |
| HCl | cc | 40 |
| Water | cc | 1000 |
| B solution: | | |
| $Na_2S$ | g | 8.6 |
| Polyethylene glycol alkyl ether (10%) | cc | 30 |
| Water | cc | 1000 |
| C solution: | | |
| Copolymer of methylvinyl ether and maleic anhydride (Gantrez AN manufactured by GAF Co.) (1.25%) | cc | 100 |

A solution and B solution were mixed with stirring and then C solution was mixed therewith. Thus obtained sol was applied to "Both sides treated polyester film PR/2 for photograph" manufactured by Celfa Co. in Switzerland at a rate of 5 m./min. by dip coating. Thus obtained sheet was treated in the same manner as in Example 1 to obtain more than 1000 copies.

When water was used as the etching solution and the dampening solution, a clear copy was obtained.

EXAMPLE 4

A low sensitive silver chloride-gelatin emulsion for gaslight printing paper was applied to a polyester film treated to form an undercoat (subbing layer) in the same manner as in Example 1.

Using a small vacuum evaporation apparatus, silver sulfide powder was evaporated in an average thickness of about 10 A. to said polyester film of 7 cm. in width and 10 m. in length by resistance heating a molybdenum boat while moving said film at a rate of 20 cm./min. under a reduced pressure of $5\times10^{-5}$ torr.

This film was taken out into air and was cut to a suitable length. The cut film was contact-printed through an original and treated with Mitsubishi Hishirapid developing solution (a treating solution for silver complex diffusion transfer) by Hishirapid processer. The printing and transfer treatment was completed within about 1 minute.

Offset printing was carried out using thus obtained printing plate in the same manner as in Example 1 to obtain more than 1000 copies.

EXAMPLE 5

A silver sol having the following compositions (percent by weight) was prepared.

| | Ml. |
|---|---|
| 6.2% $AgNO_3$ | 100 |
| 1% KBr | 1 |
| 2% Formalin | 10 |
| 0.03 N NaOH | 100 |

Water was added to obtain 200 ml. of a sol.

Thus obtained sol was applied by dip coating to Mitsubishi Hishicopy-CH-F to which silver chlorobromide emulsion was applied.

An original was reduction-copied using thus obtained sheet by a plate-making camera. Then, negative image was developed with D–72. Said D–72 has the following compositions.

| | | |
|---|---|---|
| Water (50° C.) | cc | 500 |
| Metol (p-methylaminophenol sulfate) | g | 3.1 |
| Sodium sulfite, anhyd. | g | 45 |
| Hydroquinone | g | 12 |
| Sodium carbonate, monohydrated | g | 80 |
| Potassium bromide | g | 1.9 |
| Water (cold) | l | 1 |

Thereafter, a positive image of metallic silver which was naked on the surface of the image receiving layer was obtained by treating with the following diffusion transfer developing solution.

Diffusion transfer developing solution:

| | | |
|---|---|---|
| Water | ml | 500 |
| Sodium thiosulfate | g | 5 |
| Anhydrous sodium sulfite | g | 50 |
| D–72 | ml | 50 |

Water was added to obtain 1 l. of solution.

Using thus obtained sheet, offset printing was carried out to obtain more than 2000 copies.

What is claimed is:

1. A direct positive sheet which comprises a hydrophilic subbing layer-coated support of a water resisting paper or a synthetic resin film and a surface layer applied to said subbing layer, said surface layer containing nuclei for physical development, said nuclei having a size of 20–100 A. and having a distance between nuclei particles of about 50–300 A., and up to 30% by weight of said nuclei of a high molecular weight hydrophilic compound.

2. An offset printing plate which comprises the direct positive sheet of claim 1, on which an oleophilic silver image is formed by silver complex diffusion transfer process.

3. A direct positive sheet according to claim 1 wherein said high molecular weight compound is present and is selected from the group consisting of gelatin, polyvinyl pyrrolidone, polyvinyl alcohol, polyacrylamide, hydroxy ethyl cellulose, methyl cellulose, copolymer of acrylamide and N-vinyl imidazole, carboxymethyl cellulose, copolymer of styrene and maleic anhydride and copolyalginic acid, and polyvinyl pyrrolidone.

4. A direct positive sheet according to claim 1 wherein said hydrophilic subbing layer on the water resisting paper or synthetic resin film contains a water soluble high molecular weight compound selected from the group consisting of polyvinyl alcohol, sodium alginate, gelatin, alginic acid, and polyvinyl pyrrolidone.

5. A direct positive sheet which comprises a hydrophilic subbing layer-coated support of a water resisting paper or a synthetic resin, a photosensitive layer which is mainly composed of silver halide-gelatin emulsion and a surface layer further applied which contains nuclei for physical development, said nuclei having a size of 20–100 A. and having a distance between nuclei particles of about 50–300 A., and having up to 30% by weight of said nuclei of a high molecular weight hydrophilic compound.

6. A direct positive sheet according to claim 5 wherein said high molecular weight compound is present and is selected from the group consisting of gelatin, polyvinyl pyrrolidone, polyvinyl alcohol, polyacrylamide, hydroxy ethyl cellulose, methyl cellulose, copolymer of acrylamide and N-vinyl imidazole, carboxymethyl cellulose, copolymer of styrene and maleic anhydride and copolymer of methylvinyl ether and maleic anhydride.

7. A direct positive sheet according to claim 5 wherein said hydrophilic subbing layer on the water resisting paper or synthetic resin film contains a water soluble high molecular weight compound selected from the group consisting of polyvinyl alcohol, sodium alginate gelatin, alginic acid and polyvinyl pyrrolidone.

References Cited

UNITED STATES PATENTS

| | | | |
|---|---|---|---|
| 3,344,741 | 10/1967 | Ormsbee | 96—33 X |
| 3,547,641 | 12/1970 | Blake | 96—33 |
| 2,779,684 | 1/1957 | Alles | 117—7 |
| 3,052,543 | 9/1962 | Bauer et al. | 96—87 R |

OTHER REFERENCES

Wall, E. J. et al.: The Dictionary of Photography, 12th ed., Iliffe & Sons, Ltd., London. Copy received in Patent Office 1931, pp. 72 and 73.

DAVID KLEIN, Primary Examiner

U.S. Cl. X.R.

96—76, 33